United States Patent
Evon

[15] 3,653,163
[45] Apr. 4, 1972

[54] MACHINE TOOL GRINDING FIXTURE

[72] Inventor: Louis J. Evon, P. O. Box 4, Watertown, Conn. 06795

[22] Filed: Mar. 10, 1970

[21] Appl. No.: 18,105

[52] U.S. Cl..............................51/218 R, 51/225, 125/11 A
[51] Int. Cl.........................................................B24b 19/00
[58] Field of Search................51/216.6, 218, 225; 125/11.7

[56] References Cited

UNITED STATES PATENTS

| | | | |
|---|---|---|---|
| 2,429,464 | 10/1947 | Jearum | 125/11 UX |
| 2,771,723 | 11/1956 | Burleson | 51/225 |
| 3,087,287 | 4/1963 | Rombold | 51/225 |
| 3,039,244 | 6/1962 | Vickerman | 51/216 UX |
| 2,741,241 | 4/1956 | Teather | 125/11 |
| 2,476,361 | 7/1949 | Elliott | 51/225 |
| 1,873,224 | 8/1932 | Shippy | 51/216 X |
| 3,187,737 | 6/1965 | Oscar | 125/11 |

*Primary Examiner*—Harold D. Whitehead
*Attorney*—Fishman and Van Kirk

[57] ABSTRACT

A fixture for refacing rectangular, cylindrical, or circular cutting tools with angled and curved surfaces including a radius device having a holder mounted for radial adjustment upon a rotary shaft and also having rotary adjustment in the plane of the shaft.

8 Claims, 5 Drawing Figures

INVENTOR.
LOUIS J. EVON

BY Fishman and Van Kirk

ATTORNEYS

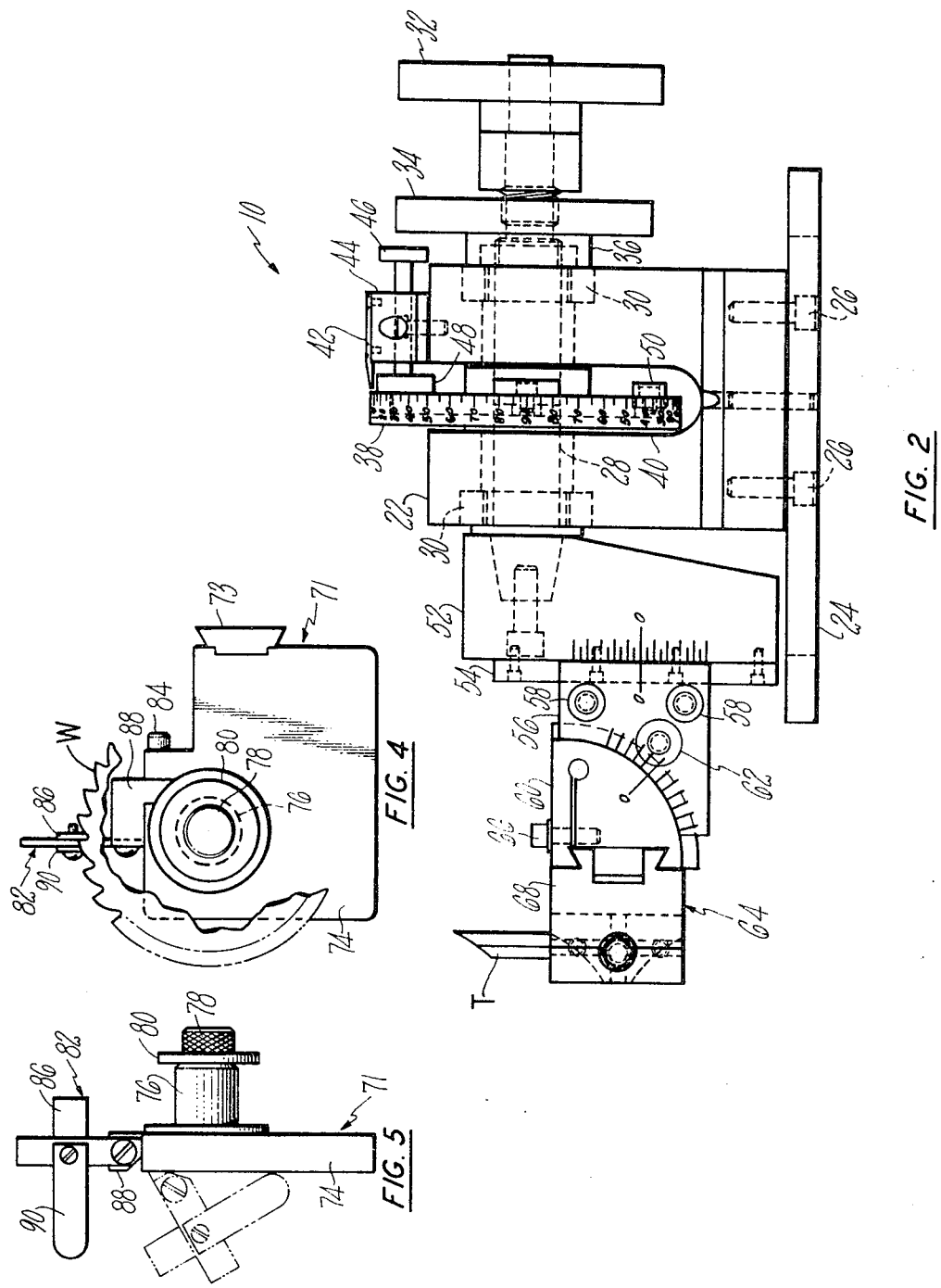

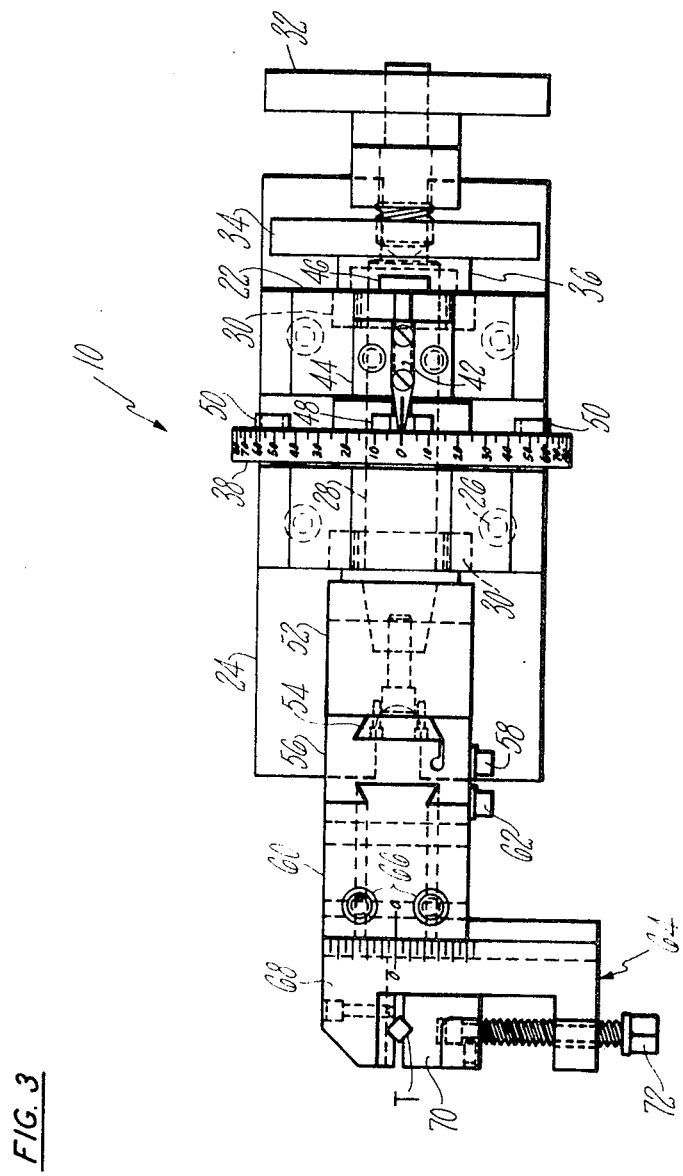

3,653,163

MACHINE TOOL GRINDING FIXTURE

BACKGROUND OF THE INVENTION

1. Field of the Invention

This invention relates to machine tool grinding fixtures.

2. Description of the Prior Art

Machine cutting tools take various forms such as rectangular tools with angled surfaces or curved cutting edges or cylindrical and circular cutting wheels which may have angled and curved cutting teeth.

The difficulty of sharpening or refacing such tools is greatly complicated by the precise curvature or angles of the tools and therefore it is desirable to have a tool fixture which can support the tool during the cutting process and position the tool so that it may be brought in contact with a grinding wheel at any desired angle. It is further desirable that the fixture be capable of sweeping the tool across a grinding wheel in a continuous motion so that a smooth cutting surface can be generated or reformed on the cutting portion of the tool.

Summary of the Invention

The invention relates to a tool mounting fixture which permits a tool face to be ground with generally flat or curved cutting edges at any desired angle on the tool.

The tool consists basically of a fixture in which a shaft is rotatably mounted and tool supporting structure is connected to one end of the shaft. The mounting structure comprises an arm extending radially from the shaft and a tool holding block that may be adjustably positioned at various radial stations on the arm. The holding block, in addition to the radial adjustment, can also be tilted in a plane defined by the arm and the rotatable shaft. The holding block includes various tool gripping attachments.

In one embodiment of the invention, the gripping attachment is a vise-type clamp which can be adjustably positioned within the holding block. The vise clamp is particularly suitable for holding tools of rectangular or oblong shape.

In another embodiment of the invention, tool gripping attachment is particularly adapted to hold cylindrical or wheel type cutters. The attachment includes a locking element which prevents the wheel from rotating as individual teeth on the wheel are brought in contact with the grinding wheel. This attachment is also capable of being adjustably positioned within the tool holding block.

The angle at which the tool holding block may be tilted can be measured by means of a scale scribed on the parts which rotate relative to one another. A similar scale may be scribed on portions of the holding block and the radially extending arm to precisely measure the offset of the holding block on the arm.

In order to measure the arc through which the tool is swept as it moves across the surface of a grinding wheel, a calibrated wheel is attached to the rotatable shaft and a reference on the stationary portion of the fixture cooperates with the wheel to accurately read the calibrations. Incorporated with the wheel are a pair of adjustable limit stops. The arc through which the tool is swept can be set by the limit stops in advance of the grinding operation. In addition, a hand wheel can be attached to the rotatable shaft to facilitate movement of the tool across the grinding wheel. A shaft lock may be provided if desired to fix the shaft at a given position while the tools or tool supporting structure are changed or adjusted.

DESCRIPTION OF THE DRAWINGS

Referring now to the drawings wherein like elements are numbered alike in the several figures:

FIG. 2 is an elevation view of the grinding fixture with the vise-type tool gripping attachment in place.

FIG. 3 is a plan view of the tool fixture shown in FIG. 2.

FIG. 4 is an elevation view of the milling wheel attachment with a milling wheel partially cut away.

FIG. 5 is a side view of the milling wheel attachment showing the two positions of the index lock.

DESCRIPTION OF THE PREFERRED EMBODIMENTS

Figure 1:
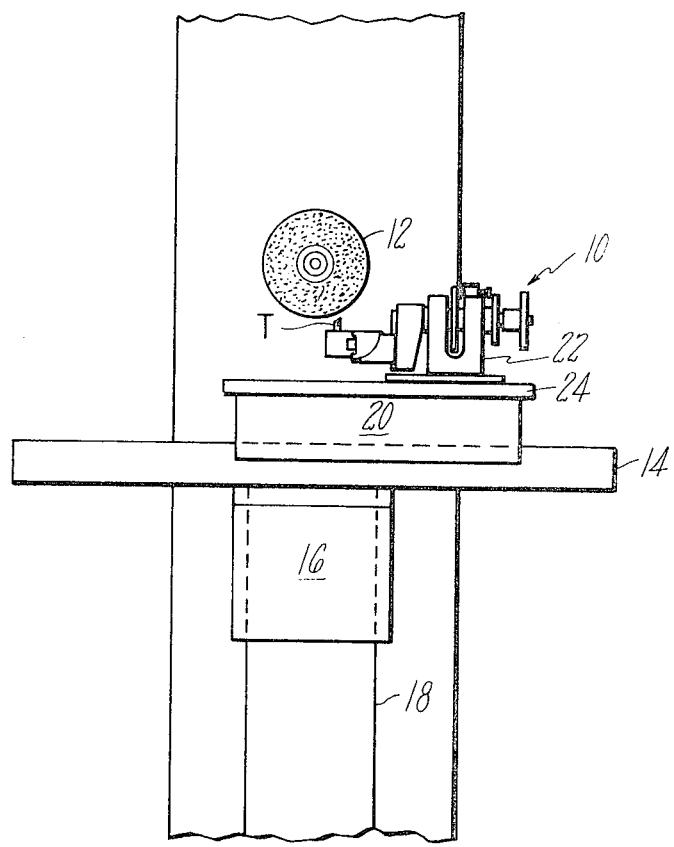
FIG. 1 shows the tool fixture installed in a work environment including the positioning of the fixture with respect to a grinding wheel.

Reference to FIG. 1 shows the grinding tool fixture generally designated by the numeral 10 installed in a work environment. The fixture 10 supports a tool T in the region immediately adjacent to a grinding wheel 12 so that various angular and contoured tool faces may be formed on the tool T in accordance with the purposes of my novel fixture design. The fixture is mounted on a movable table 14 so that it may be positioned with respect to the grinding wheel 12. The grinding wheel 12 may be driven by means of an electrical motor or a pulley drive system not shown. The movable table 14 can be attached by means of bracket 16 to a frame 18 for vertical movement. The vertical motion of the table permits my fixture to accommodate tools of various sizes and shapes without requiring the grinding wheel to be moved. For a similar purpose, mounting platform 20 is horizontally adjustable on the table 14. By mounting my fixture on the movable table and platform it may be advantageously employed to support tools of all types and sizes.

Reference to FIGS. 2 and 3 reveals the tool fixture in greater detail.

The main housing 22 of the fixture is mounted to a base plate 24 by means of four cap screws 26. The housing 22 forms the principle stationary structural member for supporting the tool from the mounting platform 20 shown in FIG. 1. A shaft 28 is journaled within the housing by means of bearings 30 at each end wall of the housing. Each end of the shaft 28 extends beyond the bearings 30 in cantilever fashion. Connected to the one end of the shaft is a hand wheel 32 which may be splined or suitably secured to the shaft to manually rotate the shaft. A shaft locking wheel 34 including an internally threaded sleeve or lock nut 36 engages the shaft 28 and may be rotated against the end wall of the housing 22 to lock the shaft 28 to the housing 22. Such a locking wheel may be desirable to prevent the shaft 28 from rotating while the tool to be ground or the tool gripping attachments are changed or while adjustments in the tool supporting structure are being made.

A calibrated dial wheel 38 is secured to the shaft 28 within a slot 40 in the housing 22. The wheel 38 extends beyond the upper surface of the housing 22 and cooperates with a reference pointer 42 mounted on top of a stop block 44. As an alternate locking device for the shaft 28, a spring loaded plunger 46 may be included within the block 44 and can be axially displaced to engage a cutout in a nesting block 48 securely mounted to the dial wheel 38. Engagement of the plunger 46 and nesting block locks the wheel 38 and consequently the shaft 28 to the housing 22.

If it is desired to limit the displacement of the tool as it is swept back and forth across a grinding wheel, two limit blocks 50 may be secured in a circumferential track in the dial wheel 38. The limit blocks 50 can be secured by means of a clamping cap screws (not shown) and will engage the spring loaded plunger 46 to limit the rotation of the shaft 28. If no limits are to be placed on the rotation of the shaft, the spring loaded plunger may be latched in a withdrawn position by a conventional twist lock. If the nesting block 48 is to be secured on the same wheel as the limit block 50 then it is preferable to have two positions to which the plunger 46 may be withdrawn. Maximum withdrawal permits both the nesting block 48 and the limit blocks 50 to clear the plunger and consequently complete freedom of rotation of shaft 28 is permitted. At an intermediate position, the plunger is permitted to intercept only the limit blocks 50. When not withdrawn the plunger may fully engage a cutout in the nesting block 48.

At the opposite end of the shaft 28 from the hand wheel 32 a laterally extending mounting arm 52 is secured to a tapered portion of the shaft by means of a cap screw. Secured to the arm 52 is a radially directed way 54 which dovetails with a slide assembly 56. A pair of cap screws 58 may be tightened or loosened to respectively secure or slide the assembly 56 on the way 54. As clearly shown in FIG. 2 a graduated scale on the arm 52 and a zero index on assembly 56 may be used to position the assembly at a preselected offset from the axis of the shaft 28.

The projecting end of the slide assembly 56 includes a curved dovetailed slot. A mating dovetailed portion of a tool attachment adapter 60 engages the slot in slide assembly 56 and permits the adapter 60 to be rotated in a plane defined by the radially extending arm 52 and shaft 28. A cap screw 62 may be used to place the adapter at any desired angle with respect to the slide assembly 56 and a zero index and scale carried by the adapter and the assembly may be used to set the angle of the adapter and tool at a preselected value. The ability to tilt the tool with respect to the axis of shaft 28 is a principle feature of my invention and permits a tool face to be ground at various angles while the tool is simultaneously swept back and forth across the grinding wheel surface by means of the hand wheel 32.

Another feature of my invention is the adjustability of the slide assembly 56 on the laterally extending arm 52. It will be noted that the adjustment permits the tool face to be located either above or below the intersection of the axis of shaft 28 with the grinding wheel. The angular adjustability of the tool adapter 60 cooperates with the radial adjustability of the slide assembly 56 to permit the angularly of the tool face to be adjusted over a broad range. The radii of the tool faces may also be adjusted by the radial offset on arm 52.

Another feature of my invention is the capacity of the fixture to accommodate tools of various types. In one embodiment of the invention a vise-type tool gripping attachment 64 is connected to the adapter 60 by means of a dovetailed way and cut out as shown in FIGS. 2 and 3. Cap screws 66 may be used to secure the attachment 64 at selected lateral positions measured by means of the index and the scale carried by the adapter 60 and the attachment 64. The tool gripping attachment 64 consists principally of a base member 68, a sliding clamping jaw 70 and a clamping screw 72. As shown in FIGS. 2 and 3 the tool T is clamped between the jaw 70 and base member 68 in conventional fashion.

Another embodiment of my invention includes a milling wheel attachment 71 as shown in FIGS. 4 and 5. It should be understood that the attachment 71 will be used in place of the vise-type gripping attachment 64 shown in FIGS. 2 and 3. The attachment 71 includes way 73 which also mates with the dovetailed slot in tool adapter 60. The interchangeability of the attachment 64 and the attachment 71 is permitted by identical connectors at the interface with adapter 60.

The miller attachment 71 is composed basically of a mounting plate 74 and a milling wheel arbor 76 on which a cutting wheel W or other cylindrical cutters may be mounted. A thumb screw 78 and washer 80 are used to secure the wheel axially on the arbor 76. Arbors of various sizes may be used to accommodate wheels having different mounting holes. In FIG. 4 the wheel W is partially cut away and the screw 78 and washer 80 are removed to clearly show the arbor 76. The wheel W has been removed in FIG. 5 for clarity.

To prevent the wheel W from turning while various radii and angles are ground on the teeth of the wheel, an index lock 82 is pivotally attached to the mounting plate 74 by means of a cap screw 84. The lock consists of a pall 86 and pivot arm 88. A lever 90 extending from the pall 86 permits the index lock to be swung from its locked position in which the teeth of the wheel W are engaged by the pall 86 to an unlocked position shown in phantom in FIG. 5. It will be understood that the screw 78 and washer 80 could be used to lock the wheel W in position by means of the friction applied to the wheel from washer 80; however, since the wheel should not be permitted to shift when it is brought in contact with the grinding wheel, the more positive index lock is preferred. The plate 74 may have a plurality of threaded holes for screw 78 so that wheels of various diameters can be accommodated by the lock 82.

It will be noted that various modifications can be made to the apparatus as disclosed without departing from the spirit and scope of the invention. For example, while I have shown that the adjustable components can be held in alignment and slide with respect to one another by means of dovetailed slots and matching ways, it will be readily understood that slotted elements with clamping screws spaced along the slots could be alternately employed. In addition, various locking devices such as palls or pins can be employed to hold the shaft 28 in position. If desired, the calibrated wheel 38 may be mounted directly to the hand wheel 32 and the limit stops 50 could engage abutments projecting from the housing 22 in the path swept by the stops.

Having thus described the various embodiments of my invention I claim:

1. A radius grinding tool fixture for variably positioning a tool during a grinding process comprising:
   a fixture support;
   a shaft journaled in the support for rotary motion, said shaft being on a horizontal axis and having a first end projecting along the shaft axis from one side of the support in cantilever fashion;
   a tool mounting arm secured to the first end of the shaft and extending generally in a radial direction with respect to the axis of the journaled shaft, said tool mounting arm having a mounting way extending radially with respect to said shaft axis; and
   a tool holder unit slidably mounted to the arm at said mounting way and extending in a horizontal direction, said holder including a tool gripping portion rotatable in a plane defined by said mounting way and the shaft axis, said tool holder thereby having two degrees of freedom of motion.

2. The fixture of claim 1 wherein:
   said tool holder includes a scale and zero index for reading the rotational position of the tool gripping portion with respect to the tool holder unit.

3. The fixture of claim 1 wherein:
   the tool gripping portion is additionally adjustable in a direction transverse to the tool holder unit and the shaft.

4. The fixture of claim 1 wherein:
   the tool gripping portion includes a mounting hub for a wheel-type tool and an indexing lock means for preventing rotation of the tool at preselected positions of the tool on the hub.

5. The tool fixture of claim 1 further including:
   a calibrated wheel mounted to the shaft for rotation therewith; and
   reference means mounted to the support and cooperating with the calibrated wheel for accurately reading the calibrations on the wheel.

6. The tool fixture of claim 5 still further including:
   a first limit stop carried by the calibrated wheel on the rotatable shaft;
   a second limit stop carried by the support and interposed in the path swept by the first limit stop for abutment therewith; and
   one of the stops having an adjustable position to vary the limit to which the shaft and the wheel can be rotated.

7. The tool fixture of claim 1 wherein:
   the second end of the journaled shaft projects along the shaft axis from the side of the support opposite the one side in cantilever fashion; and
   a manual rotation member is mounted to the second end of the shaft for rotation therewith.

8. The tool fixture as described in claim 1 further including:
   shaft locking means for securing the journaled shaft and supported tool in a fixed position with respect to the support.

* * * * *